3,117,938
CUPROUS CHLORIDE-BENZONITRILE CATALYST FOR PREPARING ACETYLENE REACTION PRODUCTS
Harry O. Burrus and John L. Sheard, Lewiston, N.Y., and Sterling N. Vines, Memphis, Tenn., assignors to E. I. du Pont de Nemours and Company, Wilmington, Del., a corporation of Delaware
No Drawing. Filed Dec. 23, 1959, Ser. No. 861,432
2 Claims. (Cl. 252—429)

This invention relates to cuprous chloride catalyst compositions, and is more particularly concerned with anhydrous cuprous chloride catalysts suitable for use in liquid phase reactions of acetylene. This application is a continuation-in-part of our copending application Serial No. 637,060, filed January 30, 1957, now U.S. Patent No. 2,920,098, issued January 5, 1960, and entitled "Acrylonitrile Synthesis."

Acidified aqueous solutions of cuprous chloride have long been used to catalyze reactions of acetylene, such as polymerization of acetylene to vinylacetylene and higher polymers, production of acrylonitrile by reaction of acetylene with hydrogen cyanide, and production of vinyl chloride by reaction of acetylene with hydrogen chloride. Since cuprous chloride is only slightly soluble in water, a salt of an amine base and hydrochloric acid has been used as a solubilizer to get an effective amount of cuprous chloride into solution. In addition to the desired product or products, the acetylene reaction products include non-volatile by-products, insoluble in water, which accumulate in the reactor and must be removed periodically. This mixture of by-products is commonly referred to as "tars."

The above reactions are carried out at temperatures near the boiling point of water, the volatile reaction products distilling off and passing to a product recovery system. A large amount of water is also vaporized, which greatly complicates control of the reaction and subsequent product recovery. Water also reacts with acetylene to form acetaldehyde. The use of non-aqueous solvents is desirable to avoid these complications. Some of the solvents proposed are discussed in U.S. Patent No. 2,227,478, issued January 7, 1941. However, amine salts have been used to solubilize the cuprous chloride, in amounts substantially equivalent to the weight of cuprous chloride in solution, which results in serious difficulties because the by-product tars are also soluble in the effective solvents. The presence of solubilizer salts in the reaction mixture increases fouling in the reactor and complicates recovery of cuprous chloride from the reaction mixture after removal from the reactor. Non-aqueous reaction media containing amine hydrochloride solubilizer salts, such as monomethylamine hydrochloride and dimethylamine hydrochloride, are particularly objectionable because they catalyze the formation of by-products. When the proportions used to form a 40% aqueous cuprous chloride solution were used in a non-aqueous cuprous chloride catalyst solution, it was found that more tar was formed than acrylonitrile under conventional conditions for acrylonitrile production.

It is an object of this invention to provide novel anhydrous cuprous chloride compositions which are suitable for catalyzing liquid phase acetylene reactions. A further object is to provide novel catalyst compositions of this type which are an improvement over previous non-aqueous catalyst compositions, especially as to the problems discussed above. Other objects will become apparent from the specification and claims.

In accordance with this invention, it has been found that a molecular complex of cuprous chloride with benzonitrile of the formula

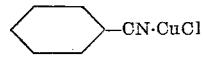

is readily dispersed to form useful catalyst solutions in organic liquids in which cuprous chloride is relatively insoluble. Substantially anhydrous liquid reaction media for catalytic reactions of acetylene, which contain 40% of cuprous chloride, can be prepared without added solubilizer salt by dissolving this cuprous chloride-benzonitrile 1:1 mol complex in benzonitrile or other liquid organic nitrile. A variety of other organic liquids can also be used in place of part of the benzonitrile, such as the solvents disclosed in the above-mentioned U.S. Patent No. 2,227,478. In operation the catalyst solution will also contain substantial amounts of acetylene reaction products. These solutions are suitable as catalysts in the processes referred to in the above patent.

Solutions of the cuprous chloride-benzonitrile 1:1 mol complex in organic nitrile liquid boiling above 100° C. at atmospheric pressure are particularly useful in processes for producing acrylonitrile from acetylene and hydrogen cyanide. A reaction medium for the acryonitrile liquid phase process preferably contains, exclusive of reaction products volatile below 150° C., at least 40% by weight of the CuCl-benzonitrile complex or at least 20% calculated as CuCl (a simple copper analysis does not indicate the form of salt). This concentration is readily obtained with solutions or dispersions of the CuCl-benzonitrile complex in substantially anhydrous organic liquid, without added solubilizer salt. For maximum productivity from given reaction equipment, still higher concentrations are desirable. Concentrations of 20% to 45% CuCl are available when the complex is dissolved at temperatures of about 100° C. in organic nitrile liquids, including mixtures of organic nitriles and other organic liquids. These other organic liquids can comprise the acetylene reaction products formed in the process, including the previously mentioned by-product tars, and the reaction media can contain up to 40% by weight of such acetylene reaction products. Preferably, the concentration of tar is kept below about 20% by catalyst replacement.

The solution will also contain a small amount of cuprous cyanide formed by reaction of the catalyst with the hydrogen cyanide. Preferably the concentration of CuCN is kept below 10% by introducing hydrogen chloride with the reactants. The amount should be carefully controlled to avoid excessive formation of vinyl chloride.

The preparation of the CuCl-benzonitrile complex and its use in the acrylonitrile process is illustrated by the following example, in which parts and percentages are by weight unless otherwise specified.

*Example 1*

Forty parts of cuprous chloride were dissolved in 60 parts of benzonitrile at 130° C. to form a catalyst solution. A portion of the solution was cooled, whereupon a crystalline complex separated as light-brown colored needles melting at 97° C. Analysis showed this to be a CuCl-benzonitrile complex of the formula

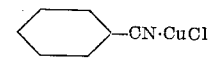

For this fresh catalyst containing only cuprous chloride and benzonitrile, the X-ray diffraction pattern shows the presence of the CuCl-benzonitrile complex and excess benzonitrile, the characteristic pattern of CuCl being absent. The crystalline complex was recovered by evaporating the excess benzonitrile under vacuum. The catalyst solution therefore consisted of 80 parts CuCl-benzonitrile 1:1 mol complex dissolved in 20 parts benzonitrile.

Acetylene, hydrogen cyanide and hydrogen chloride were bubbled through the catalyst solution at 130° C. The proportions were adjusted so that the $C_2H_2/HCN$ mol ratio was 15:1 and the HCl feed was 5% by weight of the HCN feed. The total flow was adjusted so that about 20% of the HCN came through the catalyst solution unreacted. Periodic analysis of the catalyst solution showed that by-product tars were formed at the rate of 9 parts/100 parts of acrylonitrile for the first 6 days of the run, and that a small amount of cuprous cyanide had formed. There was no catalyst replacement but the volume of catalyst solution was maintained substantially constant by adding benzonitrile. Since the tar was accumulating in the solution, this addition of benzonitrile amounted to only a partial replacement of the benzonitrile which evaporated into the off-gas. The X-ray diffraction pattern for catalyst analyzing 38.7% CuCl, 0.7% CuCn, 40.7% benzonitrile and 19.9% tar again showed the characteristic lines of the CuCl benzonitrile 1:1 mol complex and none corresponding to free CuCl or $CuCl_2$, showing that the CuCl was all present as the complex.

The run was continued without catalyst replacement, but maintained at substantially constant volume as above, for an additional 6 days. During this time the space-time-yield of acrylonitrile decreased progressively to a value of 13 lbs. acrylonitrile/cubic foot of settled catalyst solution/day and the rate of tar formation in terms of acrylonitrile production increased to 22 parts/100 parts of acrylonitrile. However, the average space-time-yield of acrylonitrile for the total of 12 days of operation without catalyst replacement was 21 lbs./cu. ft./day. At the end of the run the catalyst solution (excluding acetylene reaction products removed at 150° C. under vacuum) analyzed 36.9% CuCl, 0.45 CuCn, 21.5% benzonitrile and 41.1% tars. Hence there was insufficient benzonitrile to form the 1:1 mol CuCl-benzonitrile complex with all of the CuCl present. The X-ray diffraction analysis again showed the characteristic lines of this complex and, in addition, lines due to other, different crystal planes, but there were no lines corresponding to free cuprous chloride or cupric chloride. Therefore, the new lines indicate that part of the CuCl has become complexed with the tar. This did not occur until there was insufficient benzonitrile to form the CuCl-benzonitrile complex with all of the CuCl present, the space-time-yield of acrylonitrile decreased when this occurred, and this decrease was approximately in proportion to the loss of CuCl-benzonitrile complex.

The tar is exceedingly difficult to analyze. Under the above conditions the principal component is apparently a copolymer of acetylene and hydrogen cyanide, in a probable mol ratio between 2:1 and 3:1 and which contains nitrile, amide and aromatic groups. The CuCl-tar complex was insoluble in chloroform but, after preferential extraction of the CuCl with a suitable solvent, a major proportion of the tar thus freed of copper complex was soluble in chloroform.

In the above example, wherein an excess of hydrogen cyanide was included in the feed to produce acrylonitrile, the off-gas from the reaction catalyst contained only 0.1% by volume of monovinylacetylene or other volatile acetylene polymers. When the hydrogen cyanide is omitted then, as disclosed in U.S. Patent No. 2,227,478, issued January 7, 1941, the principal products are monovinylacetylene and divinylacetylene. However, the catalyst of the present invention has definite advantages over the catalysts of the patent for the reasons already discussed. The solvents disclosed in the patent can be used with the CuCl-benzonitrile complex of the present invention to form substantially anhydrous liquid catalyst media for acetylene reactions without the necessity of including amine salt solubilizers. The great advantage of this is illustrated by the following experiments:

Example 2

Two acrylonitrile reaction media containing CuCl benzonitrile 1:1 mol complex in a mixture of benzonitrile and dimethylformamide were prepared. Solution (A) was prepared with 35% CuCl, 60% benzonitrile and 5% dimethylformamide. Solution (B) differed only in also containing a small amount of dimethylamine hydrochloride, the ingredients being 35% CuCl, 58% benzonitrile, 5% dimethylformamide and 2% dimethylamine hydrochloride. Acetylene, hydrogen cyanide and hydrogen chloride in the molar ratio of 15:1:0.06 were fed into each solution at a reaction temperature of 100° C. The gas flow was adjusted in each case so that the reactor off-gas contained a slight amount, less than 1 mol percent of unreacted hydrogen cyanide. These conditions were maintained for 9 days without catalyst replacement, but with addition of benzonitrile and dimethylformamide to maintain a substantially constant volume of solution and to replace dimethylformamide lost by evaporation. Run (A) gave a yield of acrylonitrile of about 96% based on hydrogen cyanide and about 90% base on acetylene used. The rate of tar formation at this lower temperature than that of Example 1 was 2.4 parts tar/100 parts acrylonitrile produced. During the run, the catalyst solution contained about 5% to 15% of volatile liquid reaction products removable at 150° C. under vacuum, typical analyses of the remainder being as follows:

| Elapsed time | 3 days, percent | 5 days, percent | 7 days, percent | 9 days, percent |
| --- | --- | --- | --- | --- |
| $C_6H_5CN.CuCl$ | 64.4 | 61.6 | 61.2 | 63.2 |
| CuCN | 3.1 | 3.7 | 3.8 | 3.1 |
| $C_6H_5CN$ | 24.9 | 22.4 | 20.4 | 16.0 |
| $HCO.N(CH_3)_2$ | 3.8 | 3.4 | 4.9 | 2.8 |
| Tars | 3.8 | 8.9 | 9.7 | 14.9 |

Run (B) started off like run (A) but after an initial period of two days the rate of tar formation was consistently over 60% higher, the average rate being 4 parts tar/100 parts acrylonitrile. Thus a marked increase in the rate of tar formation was caused by the seemingly insignificant addition of 2% dimethylamine hydrochloride.

A similar run was made with a catalyst solution which analyzed initially 40% CuCl, 43.5% benzonitrile and 16.5% dimethylamine hydrochloride. The reaction temperature was 120° C. The space-time-yield of acrylonitrile rapidly declined to a value of only 8 lbs. acrylonitrile/cu. ft./day at the end of 45 hours. About 1.5 times as much tar was produced as acrylonitrile. Therefore, the addition of 16.5% dimethylamine hydrochloride caused an increase in the tar rate of over 60 times that of run (A) above, and over 16 times that of the comparable portion of the run described in Example 1. Unsatisfactory results were also obtained with monomethylamine hydrochloride. In a run similar to the above but using a catalyst solution containing 13.9% of monomethylamine hydrochloride, the catalyst separated in two phases and became inoperable after 7 days due to formation of tar and sludge. A catalyst solution containing 27% monomethylamine hydrochloride, prepared with succinonitrile solvent and operated at 140° C., produced twice as much tar as acrylonitrile.

Since many different embodiments of the invention may be made without departing from the spirit and scope thereof, it is to be understood that the invention is not limited by the specific illustrations except to the extent defined in the following claims.

We claim:

1. A substantially anhydrous catalyst solution for the catalytic conversion of acetylene to vinyl derivatives, said solution consisting essentially of at least 20% by weight of CuCl-benzonitrile 1:1 mol complex dissolved in an organic nitrile solvent boiling above 100° C. at atmospheric pressure.

2. A catalyst solution of claim 1 in which the organic nitrile solvent is benzonitrile.

References Cited in the file of this patent

UNITED STATES PATENTS

| | | |
|---|---|---|
| 2,409,124 | Heuser | Oct. 8, 1946 |
| 2,417,068 | Farlow et al. | Mar. 11, 1947 |
| 2,553,008 | Sager | May 15, 1951 |
| 2,649,472 | Lovett | Aug. 18, 1953 |
| 2,778,847 | Fujisaki et al. | Jan. 22, 1957 |
| 2,798,882 | Christopher et al. | July 9 1957 |
| 2,798,884 | Christopher et al. | July 9, 1957 |
| 2,920,098 | Burrus et al. | Jan. 5, 1960 |
| 2,999,072 | Rowbottom | Sept. 5, 1961 |
| 2,999,073 | Harris | Sept. 5, 1961 |